(12) United States Patent
Hawkins et al.

(10) Patent No.: US 7,954,447 B2
(45) Date of Patent: *Jun. 7, 2011

(54) METHOD AND APPARATUS FOR PROTECTING INNERLINER SPLICE OF A GREEN TIRE

(75) Inventors: Gregory M. Hawkins, Sparta, TN (US); Dan S. Shipley, Murfreesboro, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 450 days.

This patent is subject to a terminal disclaimer.

(21) Appl. No.: 12/217,181

(22) Filed: Jul. 2, 2008

(65) Prior Publication Data

US 2008/0264542 A1  Oct. 30, 2008

Related U.S. Application Data

(62) Division of application No. 11/514,012, filed on Aug. 31, 2006, now Pat. No. 7,407,552, which is a division of application No. 10/712,875, filed on Nov. 12, 2003, now Pat. No. 7,122,220.

(51) Int. Cl.
*B05B 13/02* (2006.01)
*B05C 11/00* (2006.01)

(52) U.S. Cl. ........ 118/306; 118/317; 118/504; 118/505; 118/62; 118/692

(58) Field of Classification Search .................. 118/504, 118/505, 692, 306, 317, 58, 62; 427/236, 427/282, 427.3, 427.4, 427.6; 15/53.4
See application file for complete search history.

(56) References Cited

U.S. PATENT DOCUMENTS

| | | | |
|---|---|---|---|
| 3,702,107 | A | 11/1972 | Rood et al. |
| 3,769,122 | A | 10/1973 | Coddington et al. |
| 3,816,165 | A | 6/1974 | Horvath et al. |
| 3,825,965 | A | 7/1974 | Root et al. |
| 4,986,210 | A | 1/1991 | Hollstein et al. |
| 5,944,893 | A | 8/1999 | Anderson |
| 6,044,954 | A | 4/2000 | McLaughlin |
| 6,077,469 | A | 6/2000 | Golightly et al. |
| 2003/0148028 | A1 | 8/2003 | Kimura et al. |

*Primary Examiner* — Yewebdar T Tadesse

(57) ABSTRACT

A method of creating an air barrier on both sides of an innerliner splice on the inside surface of a green tire when a bladder release lubricant is being applied thereto to prevent contamination of the splice. High pressure air is directed through air nozzles on both sides of the innerliner splice just prior to and during the application of the lubricant. A pressure sensor detects high or low air pressure during the creation of the air barriers to stop the spray of lubricant should either situation be detected.

10 Claims, 3 Drawing Sheets

US 7,954,447 B2

METHOD AND APPARATUS FOR PROTECTING INNERLINER SPLICE OF A GREEN TIRE

CROSS REFERENCE TO RELATED APPLICATIONS

This application is a divisional of U.S. patent application Ser. No. 11/514,012, filed Aug. 31, 2006, now U.S. Pat. No. 7,407,552, which is a divisional of U.S. patent application Ser. No. 10/712,875, filed Nov. 12, 2003, now U.S. Pat No. 7,122,220; the disclosures of which are incorporated herein by reference.

BACKGROUND OF THE INVENTION

1. Technical Field

The invention relates to the manufacture of pneumatic tires and in particular to an apparatus and system for preventing a bladder release lubricant, which is sprayed on the innerliner of a green tire, from contaminating the innerliner splice. Even more particularly, the invention relates to the use of high pressure air for forming a barrier about the innerliner splice to prevent the release lubricant from contaminating the splice.

2. Background Information

During the manufacture of pneumatic tires, a green uncured tire is transferred from a tire assembly station to a spray station where a bladder release lubricant is sprayed about the interior of the tire onto the innerliner to prevent the innerliner from sticking to an inflatable bladder at a mold station to which the green tire is subsequently delivered. After the green tire has been placed in a curing mold and the mold sealed, a bladder is inflated to force the green tire against the heated mold walls whereby the tire is formed with a desired tread pattern. After a curing period, the bladder is deflated and the mold is opened and the cured tire is removed from the mold. However, problems have been encountered in that the bladder can stick to the innerliner of the tire, causing damage to the innerliner and/or bladder upon removal of the tire from the mold.

Therefore, to overcome this sticking problem, the green tire is first delivered to a spray station where a release lubricant is applied to the innerliner of the tire, which is that portion which contacts the expandable curing bladder. However, this lubricant could affect the tire if allowed to penetrate the innerliner splice which could result in the tire being rejected. Therefore, to avoid this problem, a mechanical barrier, such as a flexible fabric, is placed over the innerliner splice at the spray station to prevent the lubricant from contacting and contaminating the innerliner splice. However, the use of this mechanical device or covering fabric requires maintenance and increases the cycle time at the spray station.

Therefore, the need exists for an improved method and apparatus which is applied at the bladder release spray station to prevent the contamination of the innerliner splice by the sprayed lubricant, which is effective and which decreases maintenance and improves cycle time of the green tire moving through the spray station prior to entering a mold station.

BRIEF SUMMARY OF THE INVENTION

The present invention provides a method and apparatus which is actuated and located at a spray station in a tire manufacturing process which protects the innerliner splice from contamination by bladder release lubricant applied to the innerliner of the tire at the spray station.

The method and apparatus of the present invention uses a pair of high pressure air streams directed against the innerliner on opposite sides of the innerliner splice just prior and during the application of the bladder release lubricant to create an air barrier about the splice to prevent the sprayed lubricant from reaching the splice area.

Another advantage of the invention is to provide a pressure sensor located downstream from the pressurized air nozzle which measures for low and high air pressure, thus detecting loss of air pressure or air nozzle blockage to insure that a required air barrier strength is created by the air nozzle. The sensor will cause the lubricant spray nozzles to be deactivated should the pressure sensor detect such high or low air pressure.

Another feature of the invention is to provide an air pressure nozzle which is inserted generally axially into the tire opening and then lowered into position adjacent the bead area of the tire to form a pair of high pressure air streams which are angled outwardly downwardly from the nozzle to opposite ends of the innerliner splice which form the air barrier until completion of the lubricant spray cycle.

Still another feature of the invention is the ability to mount the air spray nozzle on the existing mechanism used at the spray station for applying the release lubricant onto the innerliner, thereby avoiding complicated and expensive retrofitting of existing spray station apparatus.

The foregoing advantages, construction and operation of the present invention will become more readily apparent from the following description and the accompanying drawings.

BRIEF DESCRIPTION OF THE SEVERAL VIEWS OF THE DRAWINGS

A preferred embodiment of the invention, illustrative of the best mode in which applicant contemplates applying the principles, is set forth in the following description and is shown in the drawings and is particularly and distinctly pointed out and set forth in the appended claims.

Similar numerals refer to similar parts throughout the drawings.

DETAILED DESCRIPTION OF THE INVENTION

Figure 1:
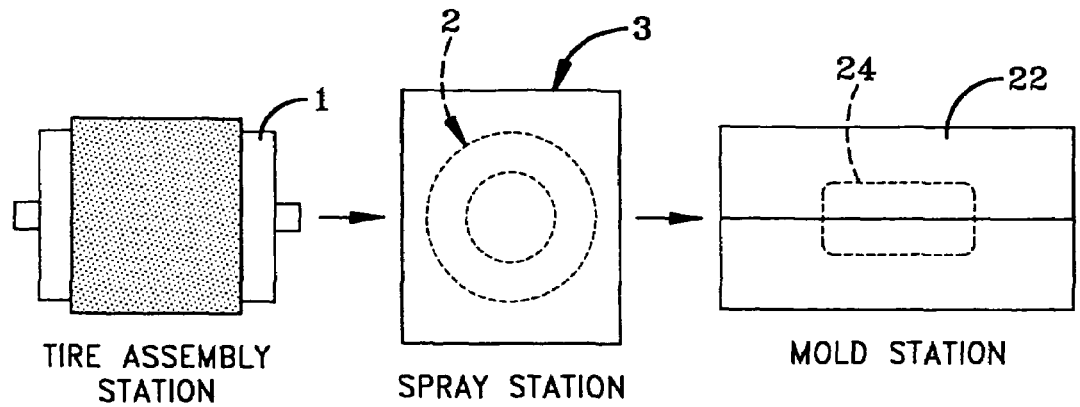
FIG. 1 is a diagrammatic view of a portion of a tire manufacturing process in which the improved method and apparatus of the present invention is utilized.

FIG. 1 is a diagrammatic illustration of a portion of a tire manufacturing process in which tire components are assembled on a tire building drum 1 to create a green tire indicated generally at 2. Tire 2 will have the usual toroidal configuration, and after removal from tire building drum 1 will be moved by a usual tire carrying sling (not shown) or other transfer mechanism, to a spray station indicated generally at 3, for applying a bladder release lubricant 6 onto the inner surface or innerliner 8 of the green tire. Spray station 3 is of a usual construction of a type currently used to apply the bladder release lubricant, in combination with a mechanism for placing a mechanical cover or flap over an innerliner splice to prevent contamination thereof by the spray lubricant.

Figure 2:
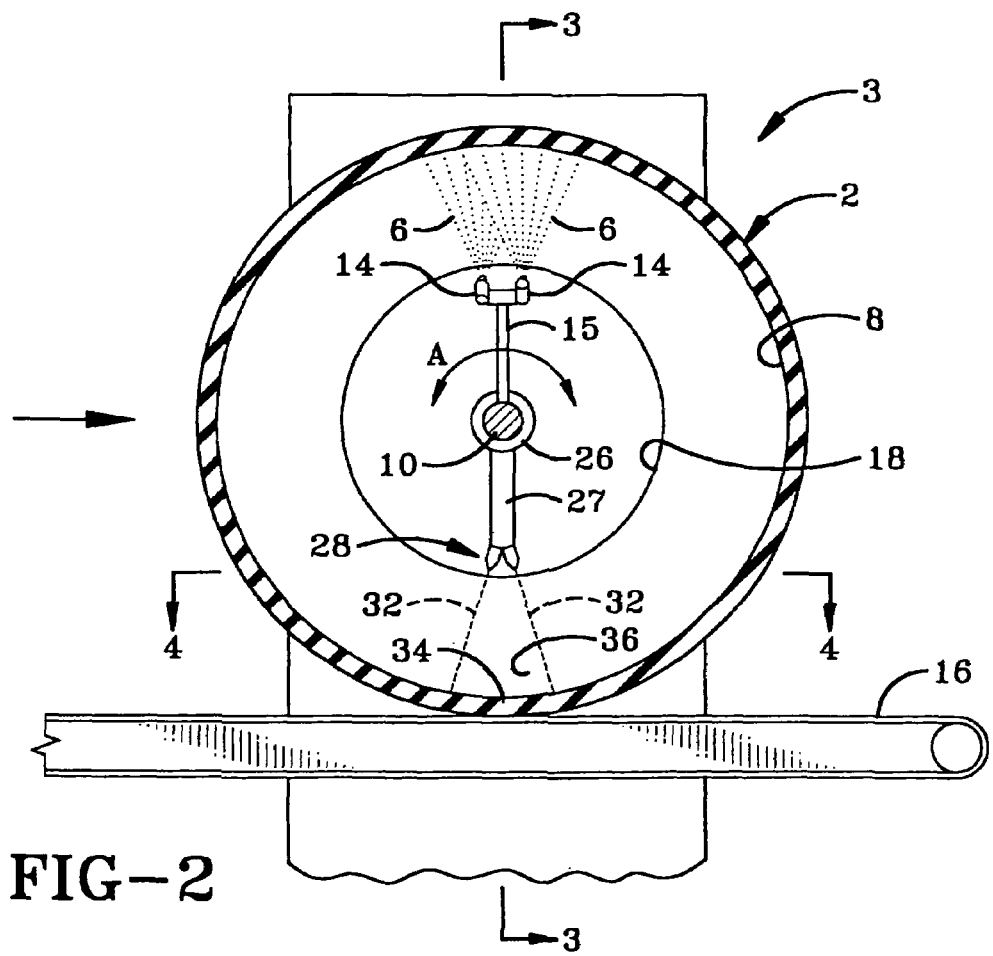
FIG. 2 is a side elevational view with portions of a green tire broken away and in section, showing the bladder release lubricant being applied to the innerliner of the tire, with the innerliner splice being protected by the air barrier.
Figure 3:
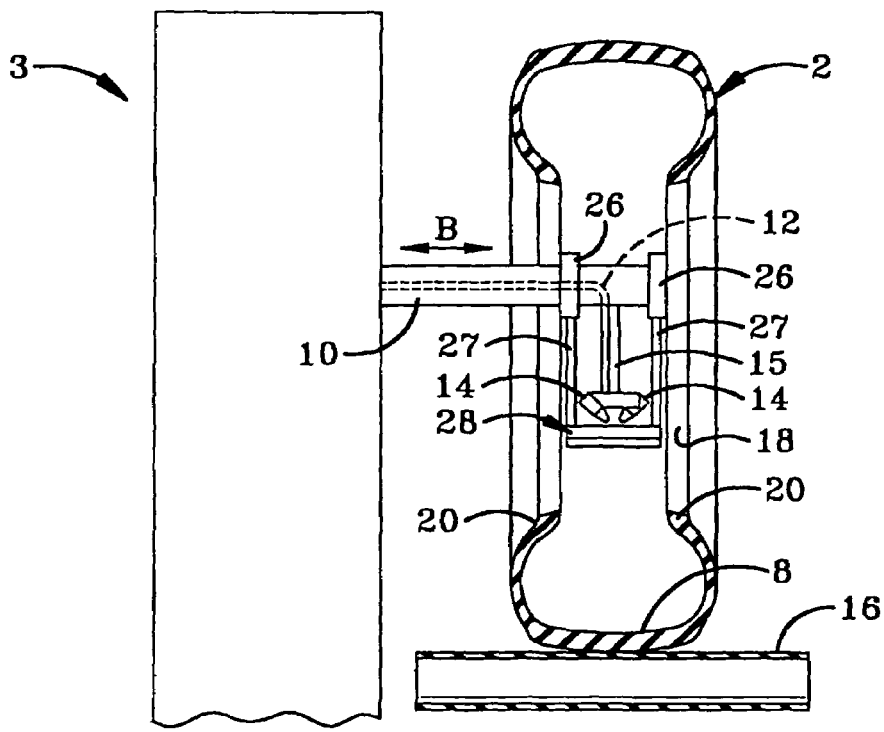
FIG. 3 is a diagrammatic sectional view taken on line 3-3, FIG. 2.

As shown in FIG. 3, spray station 3 will include a shaft 10 along which extends one or more fluid supply lines 12 which connect to a pair of lubricant spray nozzles 14, preferably oriented at 90° from each other, which are attached to shaft 10 by a bracket 15 for rotation within the tire as shown by arrow A in FIG. 2. Thus, when a green tire is moved into the spray station by a conveyor 16 or other transport mechanism, shaft 10 is moved in the direction of arrow B (FIG. 3) generally axially into the central opening 18 of the tire, defined by bead areas 20. After lubricant spray nozzles 14 have completed their spraying cycle as shown by arrow A, FIG. 2, shaft 10 and nozzles 14 are retracted out of their positions within tire 2, afterwhich the tire is then moved toward a curing mold 22. Mold 22 contains an inflatable bladder 24 which requires bladder release lubricant 6 to be applied to the innerliner of the tire to prevent sticking to the bladder after the curing operation has been completed. Heretofore, a flexible mechanical flap or cover (not shown) was moved into tire opening 18 by another shaft not shown), and then lowered radially over the innerliner splice to protect the splice.

Figure 3A:
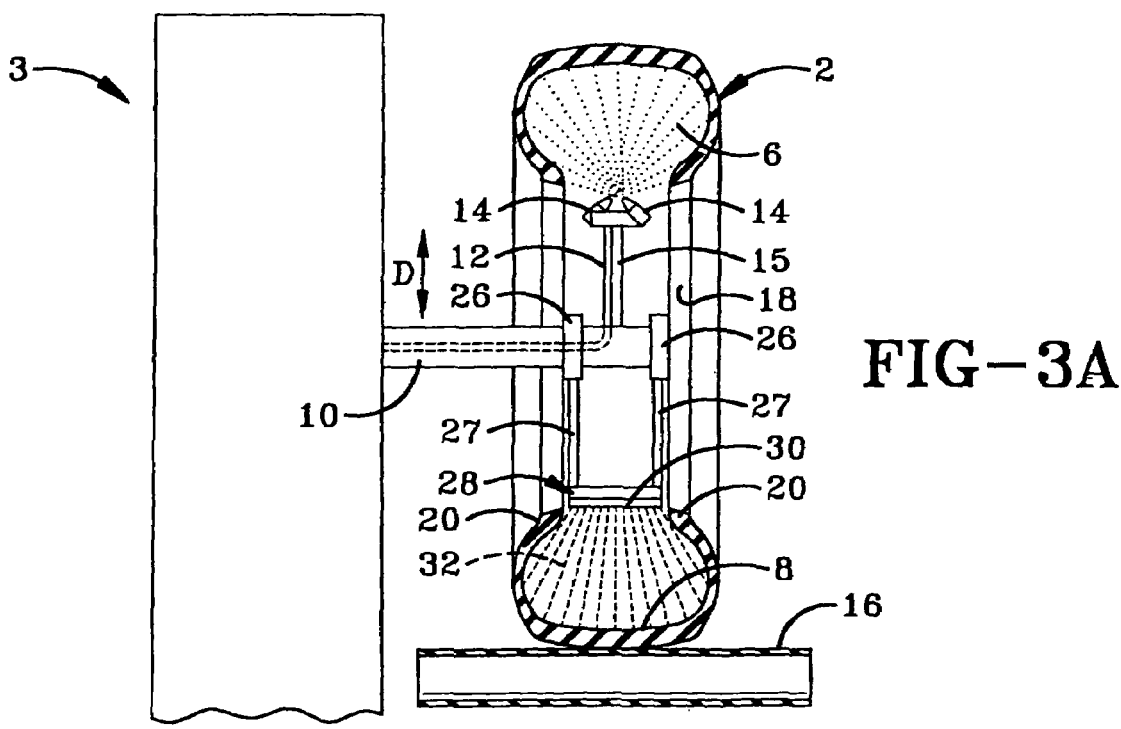
FIG. 3A is a view similar to FIG. 3 showing the lubricant spray nozzles and air nozzle in their lowered operating position.
Figure 4:
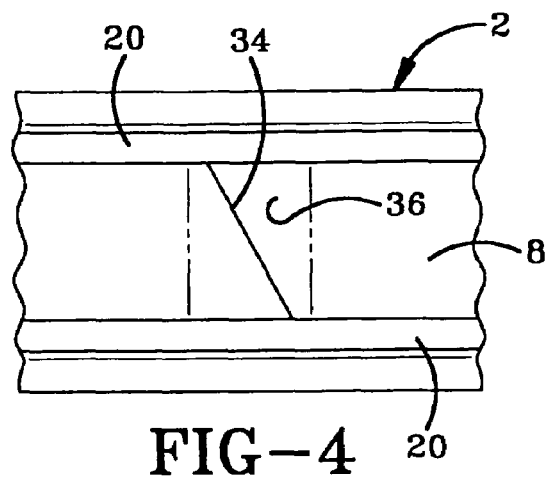
FIG. 4 is a fragmentary plan view of the innerliner splice looking in the direction of arrows 4-4, FIG. 2.
Figure 5:
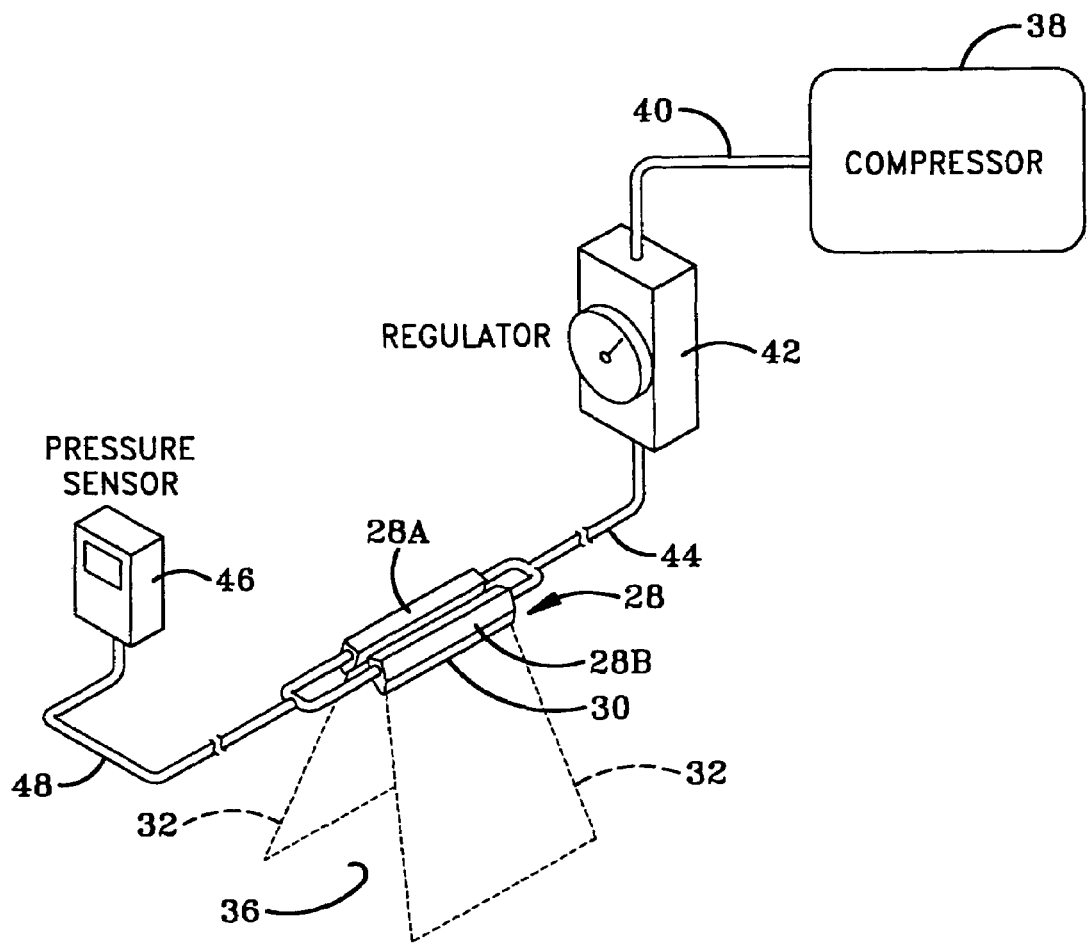
FIG. 5 is a diagrammatic perspective view of the high pressure air supply and protection system of the present invention.

However, in accordance with the present invention, this mechanical protective shield is replaced by a high pressure air nozzle indicated generally at 28. Air nozzle 28, which could include a pair of nozzles 28A and 28B as shown in FIG. 5, is mounted on shaft 10 by a pair of bearings 26 and support arms 27 extending between bearings 26 and nozzle 28. This enables shaft 12 to be rotated to spray the lubricant from nozzles 14 onto the innerliner while nozzle 28 remains in position adjacent the innerliner splice. Air nozzle 28 is formed with a pair of elongated spray orifices 30 which extend generally throughout the length of the nozzle so as to extend generally the width of the spacing between bead areas 20 of the tire as shown in FIG. 3A. Orifices 30 form a pair of high pressure air streams 32 which extend outwardly downwardly from the nozzles so as to extend on opposite ends of an innerliner splice 34 (FIG. 4) to protect the splice from the sprayed lubricant from nozzles 14. High pressure air streams 32 form a barrier about the splice, preventing the sprayed lubricant from entering the protected area indicated at 36, which extends about splice 34. At the start of the spraying cycle, shaft 10 extends into the interior of tire 2 above the central axis of the tire as shown in FIG. 3, and then lowered radially into its operational position, as shown by arrows D, to a location just above the open spacing of the tire formed by bead areas 20 as shown in FIG. 3A. After completion of the spray cycle, shaft 10 is raised radially in the directly of arrow D to the position of FIG. 3 and then retracted out of opening 18 of tire 2, enabling the tire to be moved along conveyor 16 to mold station 22.

In further accordance with the invention as shown in FIG. 5, spray nozzle 28 is connected to a high pressure air supply or compressor 38 by air line 40 which extends through a usual pressure regulator 42 which regulates the pressure of the incoming air. The high pressure air enters nozzle 28 through one or more pressure lines 44. A pressure sensor 46 is mounted downstream from nozzle 28 and is connected thereto by an air line 48. Pressure sensor 46 functions as a detector and detects whether the pressure at nozzle 28 is too high or too low with respect to a predetermined limit which indicates a loss of air pressure or blockage of the air nozzle. Should such a pressure change occur it could adversely affect air streams 32. Thus, sensor 46 will send a signal to the lubricating fluid supply source, stopping the flow of lubricant to nozzle 14. This insures that a sufficient air barrier is maintained about splice 34 whenever spray lubricant 6 is being applied to the innerliner of the tire.

Although the above discussion refers to the use of high pressure air for creating air streams 32, it is readily understood that other types of fluids could be used without affecting the concept of the invention. Also as indicated above, one or a pair of nozzles are utilized for forming the pair of air streams 32 which creates the desired air barrier about splice 34, and lubricant spray nozzles 14 can have other configurations than the pair of spaced nozzles as shown in the drawings and described above.

Accordingly, the improved apparatus and method of the invention enables a protective shield or barrier to be formed about an innerliner splice, preferably by using inexpensive high pressure air, which protects the innerliner splice during the spraying of the bladder release lubricant onto the innerliner of the tire at a spray station prior to the tire being placed in the curing mold. Furthermore, an air supply safety system insures that a sufficiently strong pair of air streams is provided by nozzle 28 to prevent the penetration of lubricant 6 into protected area 36 which extends about innerliner splice 34.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. Apparatus for protecting an innerliner splice of a green tire comprising:
   a spray station having a shaft and at least one lubricant spray nozzle mounted on the shaft and connectable to a supply of release lubricant for applying said release lubricant on the innerliner of the green tire, said shaft being moveable in a first linear direction and in a rotational direction;
   an air nozzle connectable to a supply of pressurized air which provides a stream of pressurized incoming air to the air nozzle for directing a pair of air streams on opposite sides of the innerliner splice creating a protective air barrier about said innerliner splice protecting said innerliner splice from contact by the release lubricant; and
   at least one bearing mounted on the shaft and supporting the air nozzle on the shaft free of rotation from the shaft as the shaft moves in the rotational direction when applying the release lubricant on the innerliner.

2. The apparatus defined in claim 1 wherein the air nozzle includes a pair of elongated orifices for creating the pair of air streams.

3. The apparatus defined in claim 2 wherein the pair of elongated orifices are configured whereby the pair of air streams will extend in an outwardly angled direction from said air nozzle.

4. The apparatus defined in claim 1 including a regulator for controlling the pressure of the pressurized incoming air entering the air nozzle and a pressure sensor for detecting a reduction or increase of the pressure of the pair of air streams at the air nozzle.

5. The apparatus defined in claim 1 including a compressor and a pressure regulator for regulating the pressure of the pressurized incoming air to the nozzle and a pressure sensor for detecting the pressure of the pair of air streams at the air nozzle.

6. The apparatus defined in claim 5 wherein the pressure regulator is located upstream of the air nozzle and the pressure sensor is located downstream of the air nozzle.

7. The apparatus defined in claim 1 wherein the air nozzle is mounted on the shaft by a pair of spaced bearings.

8. The apparatus defined in claim 1 including one or more fluid supply lines mounted on the shaft for connection to the supply of release lubricant.

9. The apparatus defined in claim 1 including a pair of release lubricant spray nozzles oriented 90° from each other.

10. The apparatus defined in claim 1 wherein the shaft is moveable in a second linear direction substantially perpendicular to the first linear direction.

* * * * *